United States Patent
Ahn et al.

(10) Patent No.: US 11,879,540 B2
(45) Date of Patent: Jan. 23, 2024

(54) LUBRICATION STRUCTURE OF PLANETARY GEAR SET UTILIZING INNER PIPE

(71) Applicants: Hyundai Motor Company, Seoul (KR); Kia Corporation, Seoul (KR)

(72) Inventors: Chulmin Ahn, Anyang-si (KR); Baekyu Kim, Hwaseong-si (KR); SungGon Byun, Hwaseong-si (KR); Yohan Kim, Busan (KR); Su Hyeon Maeng, Seoul (KR); Dong Hui Cheon, Hwaseong-si (KR); Jieun Kim, Suwon-si (KR); Sun Sung Kwon, Anyang-si (KR); Junyoung Ha, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/724,844

(22) Filed: Apr. 20, 2022

(65) Prior Publication Data

US 2023/0167895 A1 Jun. 1, 2023

(30) Foreign Application Priority Data

Dec. 1, 2021 (KR) .................. 10-2021-0169631

(51) Int. Cl.
*F16H 57/04* (2010.01)

(52) U.S. Cl.
CPC ....... *F16H 57/043* (2013.01); *F16H 57/0486* (2013.01)

(58) Field of Classification Search
CPC .................. F16H 57/043; F16H 57/0486
See application file for complete search history.

(56) References Cited

U.S. PATENT DOCUMENTS

| 9,452,673 | B2 * | 9/2016 | Kim | .............. | B60K 6/365 |
| 10,935,076 | B2 * | 3/2021 | Martin | ............. | F16C 17/00 |
| 2013/0345009 | A1 * | 12/2013 | Iwasa | ............. | B60K 6/405 |
| | | | | | 475/5 |

FOREIGN PATENT DOCUMENTS

JP 2004353780 A * 12/2004 .......... F16H 57/043

\* cited by examiner

*Primary Examiner* — Derek D Knight
(74) *Attorney, Agent, or Firm* — MORGAN, LEWIS & BOCKIUS LLP

(57) ABSTRACT

A lubrication structure of a planetary gear set includes a hollow shaft on which the planetary gear set is disposed and forming an oil passage in an axial direction thereof and a plurality of oil holes in a radial direction thereof to supply a lubrication oil to the planetary gear set, and an internal pipe provided within the oil passage of the hollow shaft, wherein a gap chamber is formed between the internal pipe and the hollow shaft with a preset gap, where a plurality of oil supply holes are formed through the internal pipe in the radial direction to fluidically communicate the gap chamber and an internal space of the internal pipe.

6 Claims, 5 Drawing Sheets

LUBRICATION STRUCTURE OF PLANETARY GEAR SET UTILIZING INNER PIPE

CROSS-REFERENCE TO RELATED APPLICATION

The present application claims priority to Korean Patent Application No. 10-2021-0169631 filed on Dec. 1, 2021, the entire contents of which is incorporated herein for all purposes by this reference.

BACKGROUND OF THE PRESENT DISCLOSURE

Field of the Present Disclosure

The present disclosure relates to a lubrication structure of a planetary gear set.

Description of Related Art

In general, a planetary gear set is applied to various shifting apparatus, such as an automatic transmission, a speed reducer, a differential apparatus capable of torque vectoring, and enables distribution and transmission of the input torque.

In the planetary gear set, a sun gear is disposed at a center, and three to four planetary gears are externally gear-meshed with an external circumference of the sun gear, and supported by a planet carrier. Furthermore, each planetary gear is internally gear-meshed with the ring gear.

The planetary gear set forms a preset gear train by gears of a sun gear, a plurality of planetary gears, and a ring gear, and specific element of the gear train are used as an input element, a reaction element, and an output element, to form a plurality of speed ratios.

In comparison with simple shaft gears, the planetary gear set is relatively compact and shows good performance in distribution and transmission of a high-level torque with light weight, providing advantage in down-sizing and light-weight design. Furthermore, each gear element may be designed to be small, so it not only reduces the bearing load in the radial direction, but also has merit in terms of noise and efficiency.

Meanwhile, the planetary gear set may be disposed on an input shaft and/or an output shaft of an automatic transmission, a speed reducer, a differential apparatus capable of torque vectoring, and the like.

At the present time, the planetary gear set is cooled and lubricated at the same time, by use of a churning oil scattered within a housing or a lubrication oil supplied by a separate hydraulic pump.

As an example of an apparatus to which the planetary gear set is applied, a differential apparatus capable of torque vectoring independently controls the torque level transmitted to the left-side and right-side drive wheels to improve the vehicle's agile movement performance and handling performance.

Here, the term "torque vectoring" refers to controlling the magnitude and the direction of an overall torque applied to a vehicle, of which an example is that a distribution ratio of a driving torque output from an engine and supplied to drive wheels is controlled, facilitating respective driving wheels to receive driving torques controlled by the torque vectoring technology.

Such a torque vectoring may be realized as an additional function of a differential device that receives an engine torque and distributes the engine torque to left-side and right-side drive wheels.

FIG. 1 is a schematic diagram of an exemplary differential apparatus configured for torque vectoring. FIG. 2 is a cross-sectional view of a planetary gear set applied to a torque multiplication device of FIG. 1 applied with a conventional lubrication structure.

First, referring to FIG. 1, an exemplary differential apparatus capable of torque vectoring includes a speed reduction device 10, a differential device 20 including a differential DIFF, a torque vectoring control motor TVCM, a torque vectoring apparatus 30, and a torque multiplication device 40, as well as a motor-generator MG as a power source. The speed reduction device 10, the differential device 20, the torque vectoring apparatus 30, and the torque multiplication device 40 are disposed on an axis of left-side and right-side output shafts OS1 and OS2.

In the differential apparatus capable of the torque vectoring, a rotation speed of the motor-generator MG is reduced in the speed reduction device 10, and the reduced speed is transmitted to the differential device 20. The differential device 20 receives a torque from the speed reduction device 10 to and transmits the received torque to left-side and right-side drive wheels while absorbing a speed difference between the left-side and right-side drive wheels.

The torque vectoring apparatus 30 adjusts a torque ratio split to the left-side and right-side drive wheels by use of a torque of the torque vectoring control motor TVCM delivered from the torque multiplication device 40 according to driving conditions such as cornering or driving in a straight line, and thereby improves driving performance such as a cornering performance and the like of a vehicle.

Here, the torque multiplication device 40 disposed on a right-side output shaft OS2 includes a planetary gear set PG, and the lubrication of the planetary gear set PG is made through the right-side output shaft OS2 which is formed as a hollow shaft.

Referring to FIG. 2, according to the lubrication structure of the planetary gear set PG, the right-side output shaft OS2 is formed as a hollow shaft to form an internal oil passage OL in an axial direction, and a plurality of oil holes OH formed as through holes are formed in the right-side output shaft OS2 in a radial direction thereof.

That is, the lubrication oil inside the oil passage OL is supplied to the planetary gear set PG through respective oil holes OH by a centrifugal force due to rotation of the right-side output shaft OS2.

According to such a lubrication structure of the planetary gear set PG, while the right-side output shaft OS2 rotates, the lubrication oil within the oil passage OL is continuously supplied to the planetary gear set PG through the oil hole OH by the by a centrifugal force.

However, when the right-side output shaft OS2 stops, the lubrication oil within the oil passage OL and the oil hole OH is expelled to a lower portion of a housing H within a short period, and the lubrication oil does not remain in the planetary gear set PG. At the instant time, when the right-side output shaft OS2 rotates again, there may be a delay in supplying the lubrication oil to the planetary gear set PG.

When such a delay of supplying the lubrication oil to the planetary gear set PG frequently occurs, various problems, such as degradation, wear, and noise, due to the lubrication delay may arise.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a lubrication structure of a planetary gear set including a hollow shaft on which the planetary gear set is disposed and forming an oil passage in an axial direction thereof and a plurality of oil holes in a radial direction thereof to supply a lubrication oil to the planetary gear set, and an internal pipe provided within the oil passage of the hollow shaft, wherein a gap chamber is formed between the internal pipe and the hollow shaft with a preset gap, where a plurality of oil supply holes are formed through the internal pipe in the radial direction to fluidically communicate the gap chamber and an internal space of the internal pipe.

The internal pipe may be formed with a through hole at an axial end portion, and may be fastened to the hollow shaft formed with a fastening hole, by a bolt which is provided to penetrate the trough hole and is engaged with the fastening hole.

The hollow shaft may be sealed by a cap provided on an external side of the fastening hole engaged with the bolt.

A quantity of the oil supply holes formed through the internal pipe may be greater than a quantity of the oil holes formed through hollow shaft.

The preset gap may be formed smaller than a diameter of the oil hole.

The lubrication oil supplied to the oil passage may be supplied to the planetary gear set through the oil supply holes and the gap chamber and the oil holes.

The internal pipe may be formed with a fastening hole at an axial end portion, and may be fastened to the hollow shaft formed with a through hole, by a bolt which is provided to penetrate the trough hole and is engaged with the fastening hole.

According to a lubrication structure of a planetary gear set utilizing an internal pipe according to an exemplary embodiment of the present disclosure, the lubrication oil may be ready for supply to the planetary gear set for a longer period. Therefore, at restarting of the rotation of the planetary gear set, the lubrication oil may be immediately supplied to the planetary gear set without a delay, removing the possibility of problems such as degradation, wear, and noise, due to the lubrication delay.

A lubrication structure of a planetary gear set utilizing an internal pipe according to an exemplary embodiment of the present disclosure may be applied for cooling and lubrication of a planetary gear set used in an automatic transmission, a speed reducer, and a differential apparatus, without employing a separate hydraulic pump.

Other effects which may be obtained or are predicted by an exemplary embodiment will be explicitly or implicitly described in a detailed description of the present disclosure. That is, various effects that are predicted according to an exemplary embodiment will be described in the following detailed description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
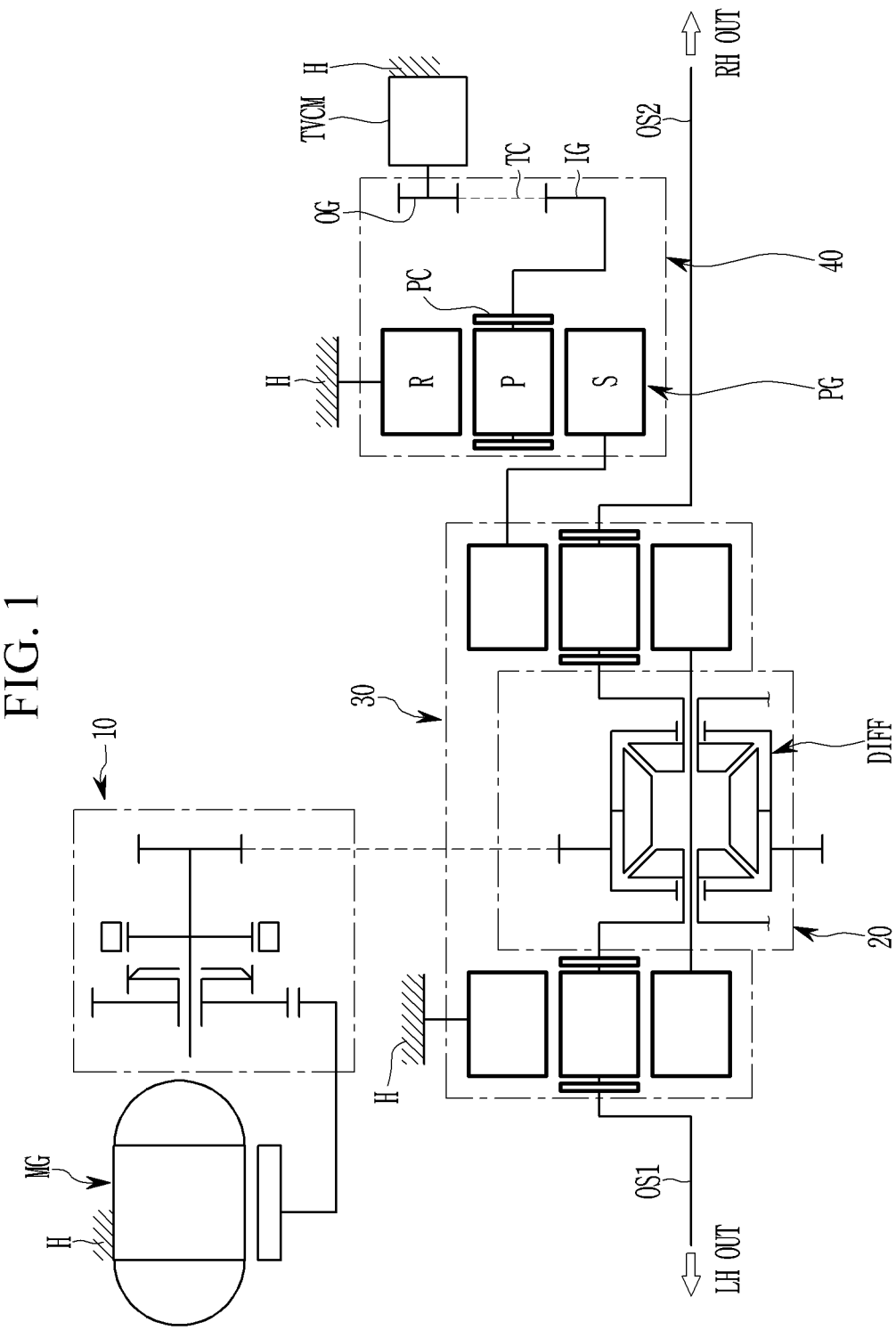
FIG. 1 is a schematic diagram of an exemplary differential apparatus capable of torque vectoring.
Figure 2:
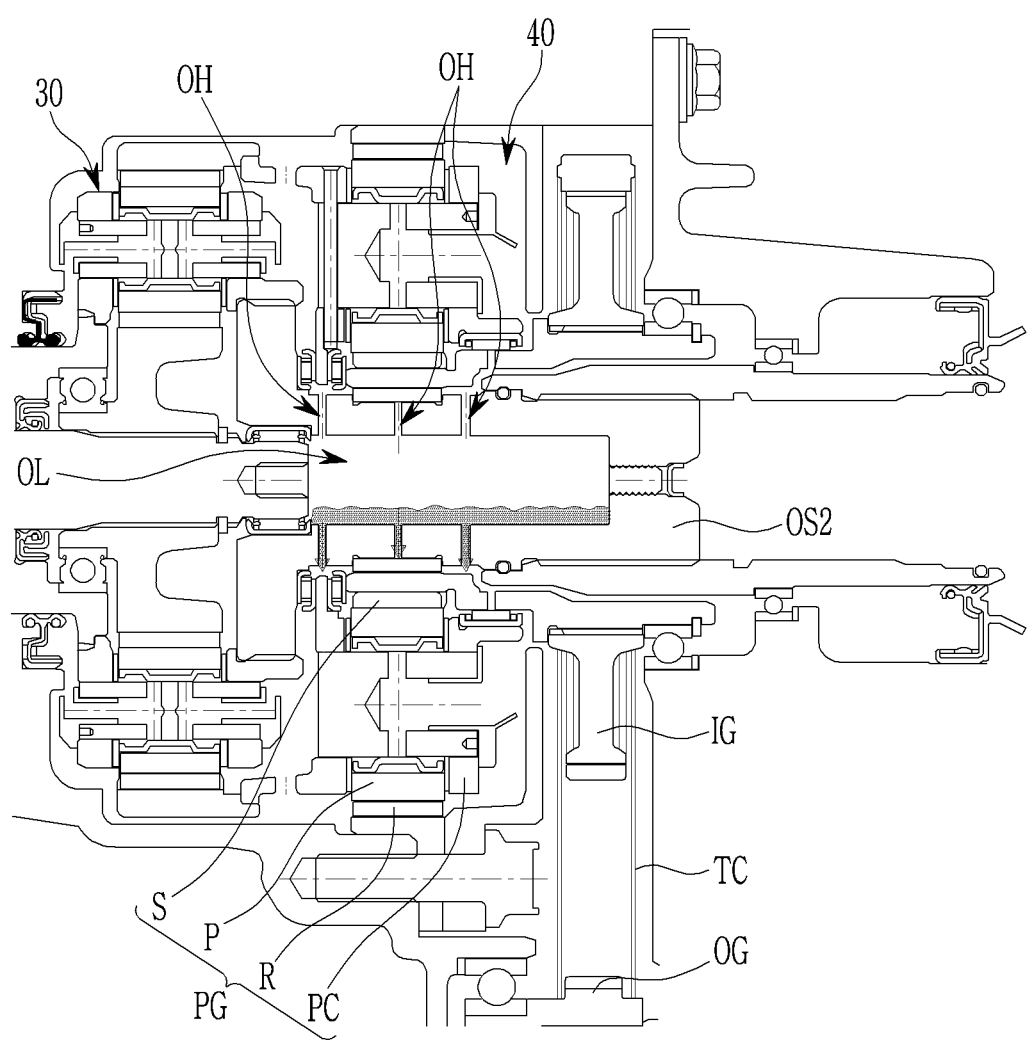
FIG. 2 is a cross-sectional view of a planetary gear set applied to a torque multiplication device of FIG. 1 applied with a conventional lubrication structure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

An exemplary embodiment will hereinafter be described in detail with reference to the accompanying drawings.

To clarify the present disclosure, parts that are not related to the description will be omitted, and the same elements or equivalents are referred to with the same reference numerals throughout the specification.

Figure 3:
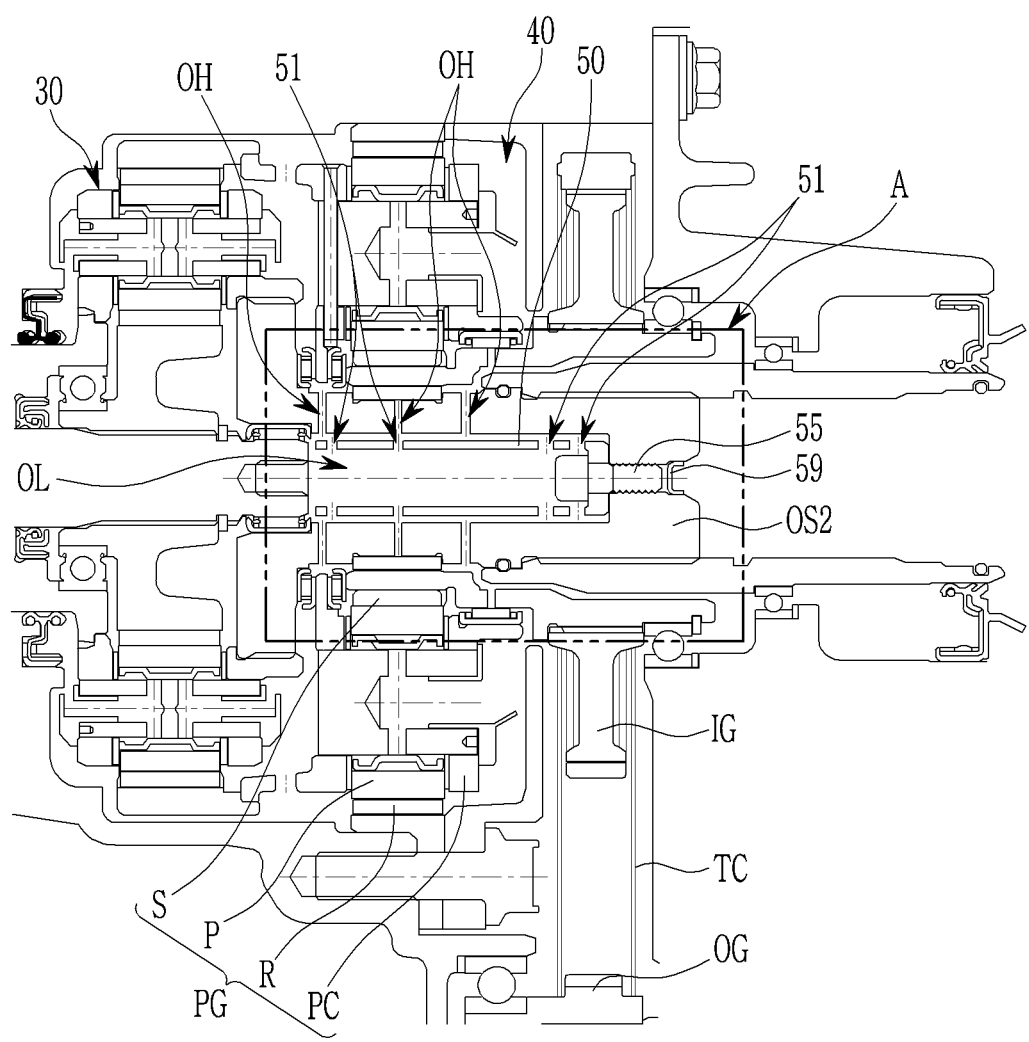
FIG. 3 is a cross-sectional view of a planetary gear set applied to a torque multiplication device of FIG. 1 applied with a lubrication structure according to an exemplary embodiment of the present disclosure.
Figure 4:
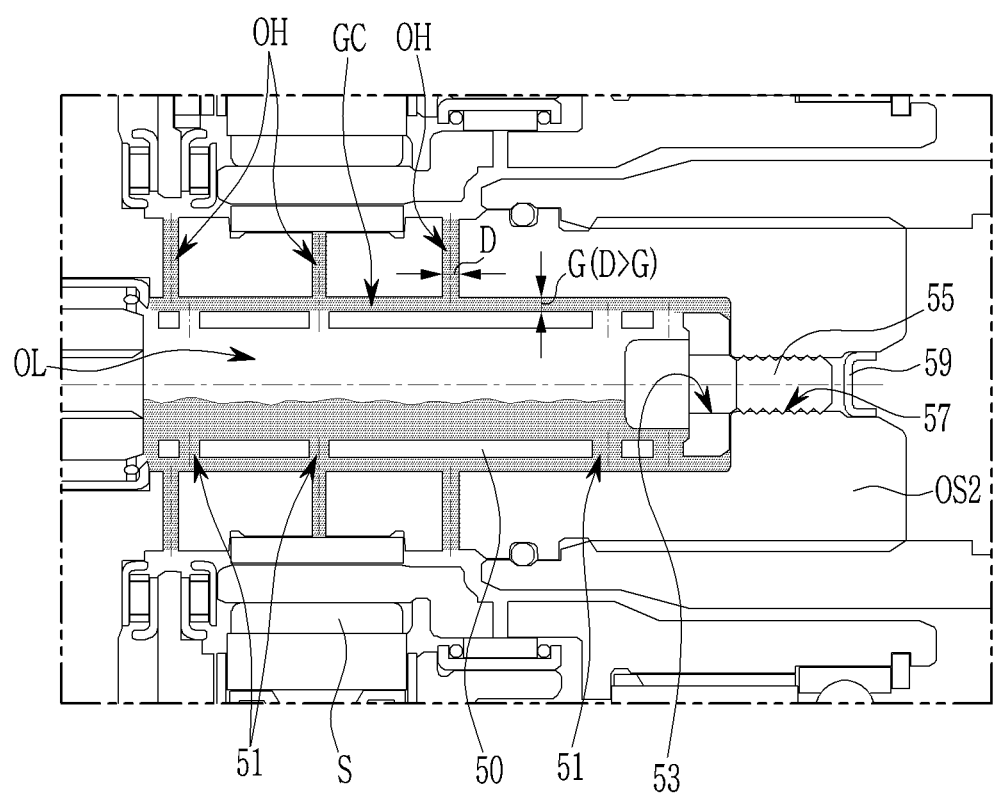
FIG. 4 is an enlarged view of a portion A of FIG. 3.

FIG. 3 is a cross-sectional view of a planetary gear set applied to a torque multiplication device of FIG. 1 applied with a lubrication structure according to an exemplary embodiment of the present disclosure. FIG. 4 is an enlarged view of a portion A of FIG. 3.

Referring to FIG. 3 and FIG. 4, a lubrication structure of a planetary gear set utilizing an internal pipe according to an exemplary embodiment of the present disclosure is described in detail, by taking an example of the planetary gear set PG applied to the torque multiplication device 40 of the differential apparatus configured for torque vectoring shown in FIG. 1.

Referring to FIG. 1, a differential apparatus configured for torque vectoring includes a motor-generator MG as a driving power source, a speed reduction device 10, a differential device 20, a torque vectoring apparatus 30 controlled by a torque vectoring control motor TVCM, and the torque multiplication device 40. The differential device 20, the torque vectoring apparatus 30, and the torque multiplication device 40 are disposed on an axis of left-side and right-side output shafts OS1 and OS2.

In the differential apparatus configured for torque vectoring, a rotation speed of the motor-generator MG is reduced in the speed reduction device 10, and the reduced speed is transmitted to the differential device 20. The differential device 20 receives a torque from the speed reduction device 10 to and transmits the received torque to left-side and right-side drive wheels while absorbing a speed difference between the left-side and right-side drive wheels.

The torque vectoring apparatus 30 adjusts a torque ratio split to the left-side and right-side drive wheels by use of a torque of the torque vectoring control motor TVCM delivered from the torque multiplication device 40 according to driving conditions such as cornering or driving in a straight line, and thereby improves driving performance such as a cornering performance and the like of a vehicle.

The left-side and right-side output shafts OS1 and OS2 are power transmission shafts provided between the differential device 20 and the left-side and right-side drive wheels, and may imply typical left-side and right-side driveshafts.

Meanwhile, the torque multiplication device 40 applied with a lubrication structure of a planetary gear set utilizing an internal pipe according to an exemplary embodiment of the present disclosure includes the planetary gear set PG disposed on an axis of the right-side output shaft OS2 between the torque vectoring apparatus 30 and the torque vectoring control motor TVCM.

The planetary gear set PG may be a single pinion planetary gear set, and includes a sun gear S, a planet carrier PC rotatably supporting a plurality of pinion gears P gear-meshed with the sun gear S, and a ring gear R internally gear-meshed with the plurality of pinion gears P to be torque-connected to the sun gear S.

The torque multiplication device 40 multiplies a torque transmitted from the torque vectoring control motor TVCM through the planet carrier PC, and transmits the multiplied torque to the torque vectoring apparatus 30 through the sun gear S.

The planet carrier PC is fixedly connected to an input gear IG. The input gear IG is connected to the output gear OG on the motor shaft of the torque vectoring control motor TVCM through a torque transmission member TC.

The right-side output shaft OS2 on which the planetary gear set PG of the torque multiplication device 40 is disposed is formed as a hollow shaft for lubrication of the planetary gear set PG.

Referring to FIG. 3, in a lubrication structure of a planetary gear set utilizing an internal pipe according to an exemplary embodiment of the present disclosure, the right-side output shaft OS2 is formed as a hollow shaft to form an oil passage OL in an axial direction, and a plurality of oil holes OH are formed in a radial direction through the right-side output shaft OS2.

Furthermore, an internal pipe 50 is provided within the oil passage OL of the right-side output shaft OS2 formed as the hollow shaft.

Referring to FIG. 4, the internal pipe 50 is configured to form a gap chamber GC of a preset gap G between an external circumference of the internal pipe 50 and an internal circumference of the right-side output shaft OS2. A plurality of oil supply holes 51 are radially formed through the internal pipe 50 to communicate the gap chamber GC and an internal space of the internal pipe 50.

Here, the internal pipe 50 is formed with a through hole 53 at an axial end portion thereof, and may be fastened to an axial end portion of the right-side output shaft OS2 formed with a fastening hole 57. A bolt 55 may fasten the internal pipe 50 to the right-side output shaft OS2, e.g., by penetrating the through hole 53 at the axial end portion of the internal pipe 50 and being engaged with the fastening hole 57 of the right-side output shaft OS2.

Furthermore, an external side of the fastening hole 57 of the right-side output shaft OS2 engaged with the bolt 55 is fitted with a cap 59 to form a close and seal structure.

The quantity of the oil supply holes 51 formed through the internal pipe 50 may be more than the quantity of the oil holes OH formed through the right-side output shaft OS2.

Furthermore, the preset gap G between the external circumference of the internal pipe 50 and the internal circumference the right-side output shaft OS2 may be formed smaller than a diameter D of the oil hole OH.

According to a lubrication structure of a planetary gear set utilizing an internal pipe, the lubrication oil supplied to the oil passage OL inflows from the internal space of the internal pipe 50 into the gap chamber GC through the oil supply hole 51 by a centrifugal force due to the rotation of the right-side output shaft OS2, and then supplied to the planetary gear set PG through the oil holes OH.

That is, according to a lubrication structure of a planetary gear set utilizing an internal pipe, while the right-side output shaft OS2 rotates, the lubrication oil within the oil passage OL is continuously supplied to the planetary gear set PG through the oil supply holes 51 of the internal pipe 50, the gap chamber GC, and the oil holes OH by the centrifugal force.

It may be understood that, by the narrow gap G between the internal pipe 50 and the right-side output shaft OS2, the supply amount of the lubrication oil to the planetary gear set PG may be controlled not to be insufficient and not to be excessive. Therefore, the narrow gap G may enable stable supply of the lubrication oil to the planetary gear set PG regardless of whether the right-side output shaft OS2 rotates at a low speed or at a high speed.

Furthermore, when the right-side output shaft OS2 stops, the lubrication oil within the oil passage OL may be expelled to a lower portion of the housing H. However, in the instant case, due to the narrow gap G, the exhaust of the lubrication oil within the oil hole OH is slowed down while the lubrication oil within the oil passage OL is exhausted. Thus, the lubrication oil in the oil hole OH may be ready for supply to the planetary gear set PG for a longer period.

Therefore, when the right-side output shaft OS2 restarts to rotate, the lubrication oil may be immediately supplied to the planetary gear set PG, and thus the delay in supplying the lubrication oil to the planetary gear set PG may be prevented, removing the possibility of problems such as degradation, wear, and noise, due to the lubrication delay.

It is notable that a lubrication structure of a planetary gear set utilizing an internal pipe according to an exemplary embodiment of the present disclosure may be applied for cooling and lubrication of a planetary gear set used in an automatic transmission, a speed reducer, and a differential apparatus, without employing a separate hydraulic pump.

Figure 5:
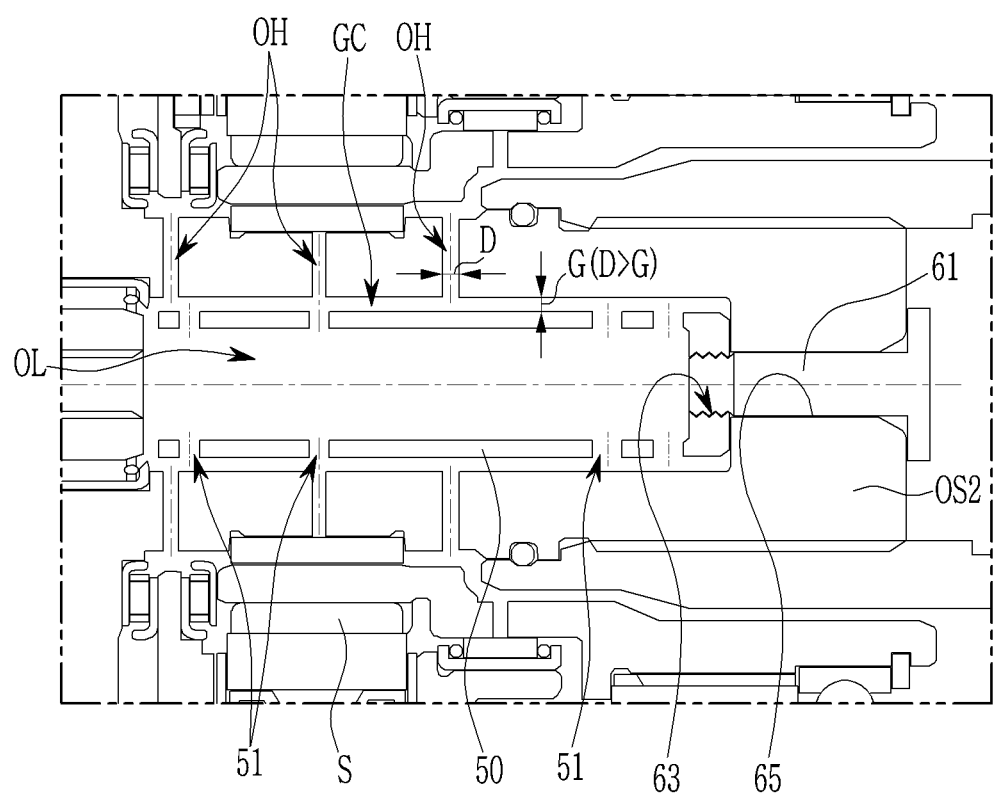
FIG. 5 is a cross-sectional view exemplarily illustrating another engagement scheme of the internal pipe applied to the portion A of FIG. 3.

On the other hand, FIG. 5 is a cross-sectional view exemplarily illustrating another engagement scheme of the internal pipe applied to the portion one of FIG. 3.

Referring to FIG. 5, the internal pipe 50 may be fastened to the right-side output shaft OS2 in a different scheme.

The internal pipe 50 is formed with a fastening hole 63 at an axial end portion, and may be fastened to an axial end portion of the right-side output shaft OS2 formed with a through hole 65. A bolt 61 may fasten the internal pipe 50 to the right-side output shaft OS2, e.g., by penetrating the through hole 65 at the axial end portion of the right-side output shaft OS2 and being engaged with the fastening hole 63 of the internal pipe 50.

The engagement scheme of the internal pipe 50 may be determined in consideration of an overall the ease of assembly, and it may be understood that the lubrication performance for the planetary gear set PG is not affected by the engagement scheme of the internal pipe 50.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A lubrication structure of a planetary gear set, the lubrication structure comprising:
    a hollow shaft on which the planetary gear set is disposed and forming an oil passage in an axial direction thereof, wherein the hollow shaft includes a plurality of oil holes in a radial direction thereof to supply a lubrication oil to the planetary gear set therethrough; and
    an internal pipe provided within the oil passage of the hollow shaft, wherein a gap chamber is formed between the internal pipe and the hollow shaft with a preset gap,
    wherein a plurality of oil supply holes are formed through the internal pipe in the radial direction to fluidically communicate the gap chamber and an internal space of the internal pipe,
    wherein the internal pipe and the hollow shaft are fastened to each other to integrally rotate, and
    wherein the internal pipe includes a through hole at an axial end portion of the internal pipe, and is fastened to a fastening hole of the hollow shaft, by a bolt which is provided to penetrate the trough hole and is engaged with the fastening hole.

2. The lubrication structure of claim 1, wherein the hollow shaft is sealed by a cap provided on an external side of the fastening hole engaged with the bolt.

3. The lubrication structure of claim 1, wherein a quantity of the oil supply holes formed through the internal pipe is greater than a quantity of the oil holes formed through hollow shaft.

4. The lubrication structure of claim 1, wherein the preset gap is smaller than a diameter of each of the oil holes.

5. The lubrication structure of claim 1, wherein the lubrication oil supplied to the oil passage is supplied to the planetary gear set through the oil supply holes and the gap chamber and the oil holes.

6. A lubrication structure of a planetary gear set, the lubrication structure comprising:
    a hollow shaft on which the planetary gear set is disposed and forming an oil passage in an axial direction thereof, wherein the hollow shaft includes a plurality of oil holes in a radial direction thereof to supply a lubrication oil to the planetary gear set therethrough, and
    an internal pipe provided within the oil passage of the hollow shaft, wherein a gap chamber is formed between the internal pipe and the hollow shaft with a preset gap,
    wherein a plurality of oil supply holes are formed through the internal pipe in the radial direction to fluidically communicate the gap chamber and an internal space of the internal pipe,
    wherein the internal pipe and the hollow shaft are fastened to each other to integrally rotate, and
    wherein the internal pipe includes a fastening hole at an axial end portion of the internal pipe, and is fastened to a through hole of the hollow shaft, by a bolt which is provided to penetrate the trough hole and is engaged with the fastening hole.

* * * * *